UNITED STATES PATENT OFFICE.

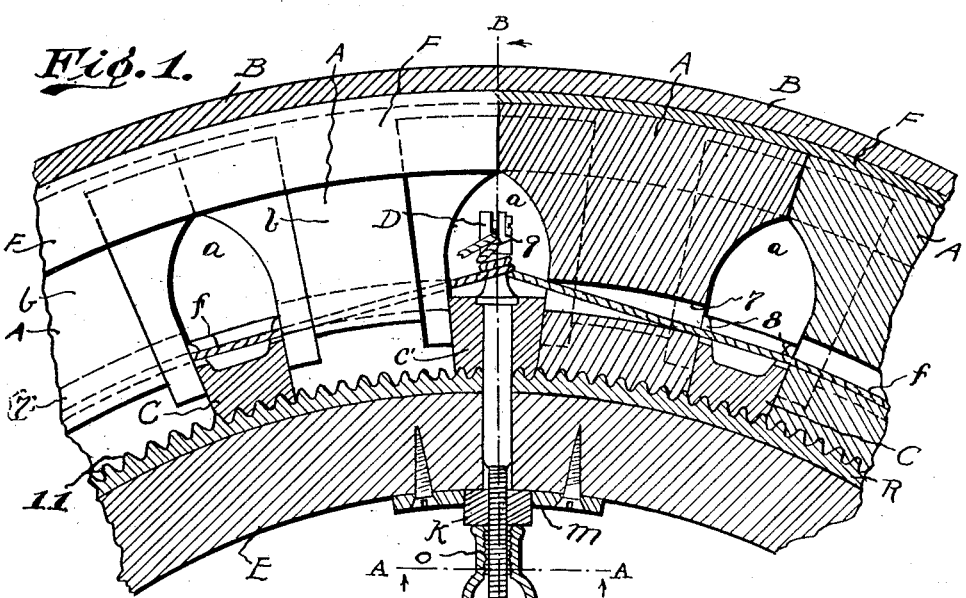

JOSEPH N. McFATE, OF PHOENIX, ARIZONA.

TIRE.

1,356,537.  Specification of Letters Patent.  Patented Oct. 26, 1920.

Application filed December 30, 1918. Serial No. 268,875.

*To all whom it may concern:*

Be it known that I, JOSEPH N. MCFATE, a citizen of the United States, residing at Phoenix, in the county of Maricopa and State of Arizona, have invented new and useful Improvements in Tires, of which the following is a specification.

This invention relates to tires, and more particularly to tires in which solid compression cushion members are employed within the casing in contradistinction from a fluid cushion member, such as an air cushion; and it has for its object to provide an improved tire of this character which will be superior in point of relative inexpensiveness and simplicity, taken in conjunction with increased durability, length of life, facility in assembling, disconnecting and replacing of parts, freedom from liability to get out of order or fail in service, capability of being positively maintained in working condition and assemblage for service, as to its several parts and features, and which will in all general respects be superior in efficiency and serviceability.

With the above and other objects in view, the invention consists in the novel and useful provision, formation, construction, combination and association of parts, members and features, all as hereinafter described, shown in the drawing, and finally pointed out in claims.

In the drawing:

Figure 1 is a detail fragmentary circumferential sectional view of a vehicle wheel felly or rim with which is associated a tire constructed and organized in accordance with the invention;

Fig. 2 is a detail transverse sectional view, taken upon the line A—A, Fig. 1, and looking in the direction of the appended arrows;

Fig. 3 is a detail radial sectional view, taken upon the line B—B, Fig. 1, and looking in the direction of the appended arrows;

Fig. 4 is an isometric detached view of one of the tire cushion members utilized in practising the invention, and of which a plurality are shown in assemblage in Fig. 1;

Fig. 5 is an isometric view of a wedge or spacer element in detached position, a number of such elements being indicated in Fig. 1, and the same being provided in installation in alternation with the cushion members shown in Fig. 4; and Fig. 6 is an enlarged detail fragmentary sectional view.

Corresponding parts in all the figures are designated by the same reference characters.

Referring with particularity to the drawing, I provide a series of cushion members A which are spaced at their bases and enlarged longitudinally at their outer ends and arched over the spaces which are shown at $a$, such outer ends being curved circumferentially to conform to the shape of the casing B, spacer blocks C being employed and interposed between the bases of the cushion members. D designates means for binding the cushion members and spacer blocks upon the rim R which surrounds the felly E. The cushion members also have lateral abutments $b$ springing from their outer ends, and these are shaped to fit the tread portion of the casing. These abutments recede from the sides of the casing at the base thereof and provide a clearance space for each abutment at $c$. These clearance spaces and the spaces $a$ permit the cushion members and their abutments to yield resiliently. These cushion members are interchangeable and the spacer blocks have interlocking connection with the cushion members by means of projecting arms $d$, two at each end of each spacer block. The sides of each spacer block are sloped toward each other and toward the center of the wheel, and are serrated or toothed as at $e$ to effectually grip the casing. The means D for binding the cushion members and spacer blocks in position on the rim comprise a flexible cord $f$ which extends loosely through holes 7 in the cushion members and through slots 8 in the upper portions of the spacer blocks, and engages a radially disposed pin $g$ which extends through the rim of the wheel and is journaled in the same -and also in a specially formed solid spacer block C'. The ends of the cord are connected to the pin at 9. The pin has flat sides $h$ which interlock with a disk $k$ which is slidable but not rotatable on the pin. Locking means $m$ are provided upon the rim of the wheel for engagement with the disk to hold the disk and pin against rotation, such locking means $m$ consisting of a plate having a suitable opening to receive and interlock with the disk which has flat sides and is held against rotation when in engagement with the plate. A cap $n$ is threaded upon the pin, as at $o$, to hold the disk in engagement with the plate $m$ and prevent rotation of the pin when the cord $f$ has been tightened up.

F designates a flexible band, which may or may not have its ends joined together, the same being disposed between the crowns or outer curved ends of the cushion members and their abutments $b$, on the one hand, and the casing B, such band being preferably cemented or otherwise secured or attached to such cushion members and their abutments.

This band F, assembled together with the cushion members and the spacer blocks, the entirety being held together by the means D for binding the cushion members and spacer blocks upon the rim E, serves to maintain a proper grouping of the cushion members and spacer blocks, and to prevent or oppose any tendency of such cushion members and spacer blocks to shift within the casing, circumferentially of the rim, so as to occasion an improper assemblage or uneven distribution of such elements or members. Likewise, this band F opposes any undue tendency of the cushion members and their abutments, to invade the casing or cause it to protrude or outwardly bulge, and furthermore serves as a protective sheath for the cushion members and their abutments, as against attack by any object, obstruction or penetrating devices encountered in the travel of the tire. This band may readily be stripped from the cushion members in order that the various features of the tire may be disassembled, such as for substitution of fresh cushion members or other parts, if such be necessary.

The notches 8 in the spacer blocks permit the same to be withdrawn from the general assemblage, such as for substitution of a fresh spacer block, without withdrawing the cord $f$ from the cushion members and spacer blocks, which would be necessary if such spacer blocks were provided with through holes, such as the holes 7 provided in the cushion members.

It is obvious that variations and substitutions may be made in the particular practice of the invention, without departing from the true spirit thereof.

I have also shown means for preventing the casing and its contained tire features from slipping or creeping about the rim or felly, and the same is illustrated as consisting of teeth or serrations 11 on the rim or felly and at the sides thereof in the zone where the side walls of the casing B engage with such rim or felly. These teeth 11 interengage with ribs $e'$ at the base of the spacing blocks $c$ and also bite into the bases of the cushion members A as is indicated quite clearly by Fig. 6, thereby rendering it impossible for the members to creep around the tire. This is a safety means which is provided to obviate any such slipping or creeping of the tire as an entirety, or of the casing, should the binding means D fail in the performance of its function.

Having thus disclosed my invention, I claim and desire to secure by Letters Patent:

1. In a tire, a series of similar and interchangeable cushion members adapted to be disposed between the casing and the rim of the wheel, the inner ends of the cushion members being spaced apart while the outer ends thereof are enlarged circumferentially of the tire and abut against each other to arch over the spaces between the members, binding means for securing the bases of the cushion members to the rim, and a binding band extending continuously around the outer faces of the cushion members to hold the members together and provide a continuous bearing surface for the tread of the casing.

2. In a tire, a series of similar and interchangeable cushion members adapted to be disposed between the casing and the rim of the wheel and having the inner ends thereof spaced apart while the outer ends thereof are enlarged and extended circumferentially to provide overhanging abutting portions which arch over the spaces between the cushion members, spacing blocks interposed between the bases of the cushion members, means for binding the spacing blocks and cushion members to the rim, and a band extending continuously around the outer faces of the cushion members to provide a continuous bearing for the tread of the casing.

3. In a tire, a series of similar and interchangeable cushion members adapted to be disposed between the casing and the rim of the wheel, spacing block members interposed between the cushion members, and a binding cord for securing the cushion members and spacing block members to the rim, one set of the said members being formed with perforations through which the binding cord is threaded, while the other set of members is formed with open notches in which the binding cord is seated when the members are in operative position.

4. In a tire, a series of independent cushion members adapted to be disposed between the casing and the rim of the wheel, spacing blocks interposed between the cushion members and having open notches in the outer faces thereof, and a binding cord for securing the cushion members and the spacing blocks to the rim, the cushion members being formed with perforations through which the binding cord is threaded while the binding cord is seated in the open notches of the spacing blocks when the parts are assembled in operative position.

5. In a device of the character described, the combination with a serrated wheel rim, of a series of independent cushion members adapted to be disposed between the casing and the rim, spacing block members interposed between the cushion members, one set of the said members having a base constructed to interlock with the serrations of the rim, and means for binding the cushion members and spacing block members upon the rim.

6. In a device of the character described, the combination with a serrated rim, of independent cushion members adapted to be disposed between the casing and the rim, spacing blocks interposed between the cushion members and having the bases thereof constructed to interlock with the serrations of the rim, and means for binding the cushion members and spacing blocks upon the rim.

7. In a device of the character described, the combination with a rim and its casing, of cushion members arranged within the casing, means for binding the cushion members to the rim and clamping the casing in position thereon, and auxiliary means for preventing creeping of the elements around the rim.

8. In a tire, a rim, a casing adapted to abut against the rim at its side walls, means for binding the casing to the rim, and auxiliary means for preventing creeping of the casing in the event of failure of such binding means; said auxiliary means comprising serrations upon the rim with which the edges of the casing side walls engage.

In testimony whereof, I have signed my name to this specification in the presence of two subscribing witnesses.

JOSEPH N. McFATE.

Witnesses:
RAYMOND IVES BLAKESLEE,
J. SHUTT.